Oct. 4, 1955
E. BARTHOLOMÉ ET AL
2,719,601
SEPARATION OF ACETYLENE FROM GASEOUS MIXTURES
Filed April 23, 1952
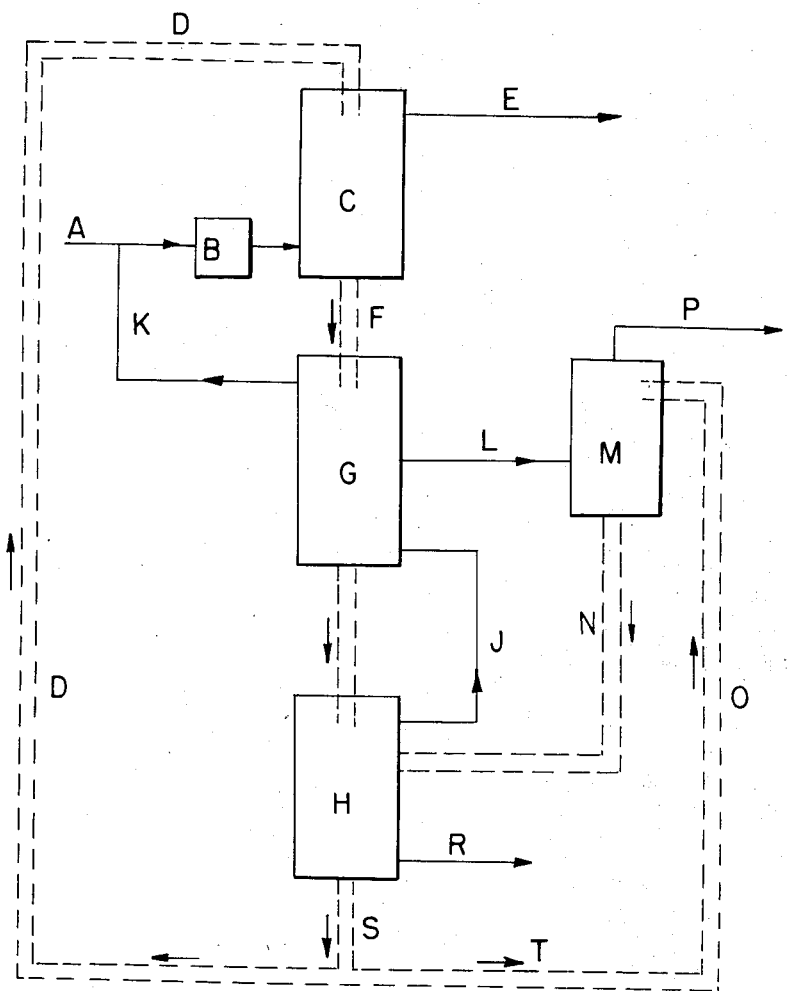
INVENTORS:
ERNST BARTHOLOMÉ
ERWIN LEHRER
LOTHAR LORENZ
BY Spencer, Johnston,
Cook & Root
ATT'YS

United States Patent Office 2,719,601
Patented Oct. 4, 1955

2,719,601

SEPARATION OF ACETYLENE FROM GASEOUS MIXTURES

Ernst Bartholomé, Ludwigshafen (Rhine), Erwin Lehrer, Bad Duerkheim, and Lothar Lorenz, Ludwigshafen (Rhine), Germany, assignors to Badische Anilin- & Soda-Fabrik Aktiengesellschaft, Ludwigshafen (Rhine), Germany Application April 23, 1952, Serial No. 283,894

Claims priority, application Germany May 4, 1951

7 Claims. (Cl. 183—115)

This invention relates to a method of separating acetylene from gaseous mixtures containing same, and more particularly to the production of acetylene of high purity from strongly diluted acetylene as obtained in high-temperature decomposition, i. e. electrical, thermic or partial combustion treatment of natural gas and similar low molecular paraffine hydrocarbons.

It is well known that diluted acetylene may be concentrated or purified by treating it with a solvent of selective absorption power for the acetylene. Such methods have to be employed to separate the acetylene contained, for example, in gas mixtures obtained by thermal or electrical treatment of more saturated hydrocarbons or gases obtained by partial oxidation of such hydrocarbons with oxygen or air. By the use of selective absorptive solvents the acetylene is separated from the bulk of the diluting gases, such as hydrogen, more saturated hydrocarbons, carbon monoxide and dioxide, nitrogen and the like. By heating the solvent or by applying reduced pressure thereto or by both methods a highly concentrated acetylene may be obtained.

Dilute acetylene of the kind referred to above usually contains compounds which are also soluble in the selective solvents used for concentrating the acetylene. Some of these impurities, e. g. propine ($C_3H_4$), vinyl acetylene ($C_4H_4$), diacetylene ($C_4H_2$), divinyl acetylene ($C_6H_6$) and benzene are even better soluble than acetylene itself. They are absorbed from the dilute gas almost completely and tend to accompany the acetylene stripped from the solvent. Even ingredients of the dilute acetylene, such as carbon dioxide or ethylene, which are more difficultly soluble in the selective solvents will be found to some extent in the concentrated acetylene depending on the degree of their solubility in the selective solvent.

It is an object of our invention to improve the separation of acetylene from gases containing acetylene and obtained by the thermal, including the electrical and oxidative decomposition treatment of more saturated hydrocarbons to such an extent that the amount of impurities in the concentrated acetylene is substantially decreased. Another object of our invention is to provide a continuous process for separating acetylene from gases obtained by high-temperature decomposition of natural gas by using organic solvents for absorption and complete recovery of the concentrated acetylene from the solvent and recirculation thereof. Other objects and advantages of our invention will be more fully understood by the following description and the accompanying drawing:

Our invention consists in contacting the dilute acetylene in an absorbing zone with an organic solvent having selective dissolving power for acetylene, leading the solvent loaded with acetylene into a desorbing or stripping zone where the acetylene is released from the solvent by heating and applying reduced pressure, and leading the solvent prior to the stripping process through a rectifying column in counter current to the gas obtained in the stripping zone.

By subjecting the solvent loaded with acetylene in a rectifying column, which should contain the conventional means for favoring the exchange of gases and liquids, to the action of the gas obtained in the stripping part of the recovery system, the impurities better soluble than acetylene will be washed out from the gas in the lower part of the column. In the upper part of the column the impurities more difficultly soluble than acetylene are replaced by acetylene while flowing down in counter current to the stripped gas. These impurities will be taken away in gaseous form together with the undissolved part of the counter current gas. This mixture is led back into the absorption part of the recovery system by adding it to the dilute acetylene to be purified according to our invention. The largest part of the impurities more difficultly soluble than acetylene thus will be removed in the lean or tail gas leaving the absorption part of the process.

By working in the manner described above, it is possible to withdraw a stream of substantially pure acetylene at a point between the bottom and the top of the rectifying column. This acetylene is pure enough to be used in most of the chemical processes of acetylene chemistry. If, however, for specific processes to be carried out with the concentrated acetylene the requirements on purity are extremely high, our invention makes it possible to prepare an acetylene of such increased purity.

The impurities better soluble than acetylene in the solvent used are completely dissolved in the contacting zone of the recovery process, i. e. the zone where the absorption takes place. Consequently, the solvent led from the contacting zone into the rectifying column will contain such an amount of these better soluble impurities as has been present in the dilute gas. This amount will also be present in the solvent at that point of the rectifying column where the stream of substantially pure acetylene is withdrawn. This cannot be prevented even if the most efficient means for the exchange of gases and liquids are provided for in the rectifying column. The effect of this fact on the purity of the acetylene withdrawn from the middle of the column is that the amount of impurities contained in this stream is defined by the equilibrium pressure at the spot where the stream is withdrawn. The amount of these impurities, is, as already indicated above, relatively small and usually does not affect the usability of the purified acetylene. When starting from gases obtained in the high temperature decomposition of natural gas, these impurities consist substantially of propine and diacetylene.

In order to further purify this acetylene, we may subject the stream of substantially pure acetylene withdrawn from the middle of the rectifying column to an additional washing step. By bringing this stream into contact with such an amount of a selective organic solvent—either the same used in the main process or a different one—as is insufficient for dissolving the acetylene contained in this stream, the better soluble impurities are removed. The most simple manner to carry out this additional purification step consists in branching off after the stripping zone part of the solvent used in the recovery process, to use it in the additional purification process and to lead it back into the stripping zone. It is also possible to provide for an independent and individual solvent circulation in the additional purifying process with a separate stripping unit. This latter method is especially suitable for the highest requirements on acetylene purity.

The particular solvent used for carrying out our invention is not essential. In principle, we may use an organic solvent stable to acetylene and its impurities and capable of dissolving acetylene selectively. We prefer to use oxygen containing organic solvents having a boiling point above 100° C. and being at least partially miscible with water. If the solvent contains some water, its percentage thereof should not be above 50 per cent and should be preferably between 0.5 and 10 per cent. Accordingly, it is not necessary to use solvents which are completely miscible with water but we may use such solvents capable of dissolving, for example, between 5 and 10 per cent of water.

The recovery of acetylene from such solvents is relatively simple and efficient by subjecting the solvent loaded with acetylene to subatmospheric pressure, e. g. 0.2 to 0.5 atmosphere, while heating to temperatures below the boiling point of the solvent. A temperature range of from 80° to 130° C. is usually sufficient to ensure complete stripping of the solvent. When stripping a solvent which contains some water, it is possible to first evaporate part of the water from the solvent under subatmospheric pressure and to free the solvent in a rectifying column from acetylene by the water-vapor ascending in counter current to the solvent. The use of water as part of the solvent has also the advantage that the recovery of the organic solvent from the stream of the substantially pure acetylene is simplified. It is sufficient to wash these gases with a small amount of water, thereby removing the traces of vaporous solvent accompanying the acetylene. The aqueous solutions of the solvent thus obtained may be added to the solvent in circulation to maintain the water content on the desired level.

Among the organic solvents used for carrying out our invention we refer to aliphatic carbonyl compounds, for example aliphatic ketones, boiling above 100° C., acetals of such ketones or of aliphatic aldehydes, aliphatic ethers, in particular those containing a hydrophilic group, e. g. a hydroxy group in addition to the ether-oxygen atom, such as glycol monoalkyl ethers. We may also use carboxylic acid esters, containing further hydrophilic groups either in the acid or in the alcohol radicle, e. g. lactic acid esters or glycol monoesters of lower carboxylic acids. We have found that lactones are very suitable as solvents, for example, $\gamma$-butyrolactone and its homologues. Acid amides, in particular alkylated acid amides, such as dialkyl formamides, alkylated ureas, bisdialkyl amides of dicarboxylic acids, and in particular lactames, such as pyrrolidone, its N-alkyl and N-acyl derivatives and their corresponding homologue lactames, are also suitable.

Referring to the drawing, the gaseous mixture containing acetylene, either under normal pressure or under a few atmospheres, say between 2 and 10, enters through pipe A into the compressor B and from there into the absorber C, where it is contacted with the selective solvent, preferably in counter current. The solvent enters from pipe D and leaves the absorber through pipe F. The gas feed from acetylene, the so-called tail gas, leaves through pipe E. It may be fed into a washing system (not shown) to be freed by scrubbing with water from any traces of solvent-vapor it contains.

The solvent loaded with acetylene and smaller amounts of other gases is released to normal pressure and flows through pipe F into a rectifying column G which is preferably a multiplate column. From this rectifying column it flows to the desorber or stripper H. Instead of using one of these desorbers, we may as well install a battery of them, the solvent leaving at the bottom of each and entering at the top of the next one. In the desorber H most of the gas is released by heating to about 100° C. and reducing the pressure to about 0.2 atmosphere. The gas thus obtained is led through pipe J into the bottom of the rectifying tower G so that it streams upward in counter current to the solvent coming from the absorber C. Part of the acetylene contained in this gas leaves the rectifying column at the top through line K, accompanied by the impurities more difficultly soluble than acetylene. Line K joins line A so that this gas is again subjected to the purification process. In the middle of the column a stream of substantially pure acetylene is withdrawn through line L.

If a further purification of this acetylene is desired, it is introduced into a washing column M where it is contacted with a side stream of the solvent entering at the top of M and leaving at N. The acetylene withdrawn through line P at the top of M is very pure.

The solvent stripped of the gases leaves the desorber H through line S. It is returned through line D to the absorber C, after having been cooled to the absorbing temperature. If the acetylene is to be further purified, a part of the solvent coming from line S is branched off through line T to flow through line O into the washer M.

The impurities better soluble than acetylene are withdrawn through line R at the bottom of the desorber H.

*Example 1*

A gas obtained by incomplete combustion of methane with oxygen is purified in a unit as described above in connection with the drawing. This gas has the following composition (percentages are by volume):

| $C_2H_2$ | $CO_2$ | $C_2H_4$ | $O_2$ | $CH_4$ | $CO$ | $H_2$ | $N_2$ | $C_3H_4$ | $C_4H_4$ | $C_4H_2$ | $C_6H_6$ |
|---|---|---|---|---|---|---|---|---|---|---|---|
| 7.8 | 3.8 | 0.3 | 0.1 | 4.4 | 26.3 | 55.3 | 1.7 | 0.08 | 0.05 | 0.11 | 0.1 |

110 cubic meters (NPT) per hour of this gas are brought into contact with 1.25 cubic meters of a mixture of 98.2 per cent of $\gamma$-butyrolactone and 1.8 per cent of water at 20° C. and under 6 to 10 atmospheres pressure. After the unit has reached its operation equilibrium, the tail gas leaving at E has the following composition:

| $C_2H_2$ | $CO_2$ | $C_2H_4$ | $O_2$ | $CH_4$ | $CO$ | $H_2$ | $N_2$ | $C_3H_4$ | $C_4H_4$ | $C_4H_2$ | $C_6H_6$ |
|---|---|---|---|---|---|---|---|---|---|---|---|
| Percent 0.1 | Percent 4.1 | Percent 0.3 | Percent 0.1 | Percent 4.8 | Percent 28.6 | Percent 60.1 | Percent 1.9 | Percent 0 | Percent 0 | Percent 0 | Percent 0 |

The pressure in the rectifying tower 6 is normal; the temperature about 20° C.

In the desorber H a temperature of about 100° C. and a pressure of 0.2 atmosphere is maintained. Through line L 8.5 cubic meters per hour of gas are withdrawn, this gas containing besides acetylene the following constituents:

| $CO_2$ | $C_3H_4$ | $C_4H_4$ | $C_4H_2$ | $C_6H_6$ | $CO$ |
|---|---|---|---|---|---|
| Percent 0.1 | Percent <0.3 | Percent <0.01 | Percent 0.01 | Percent 0.005 | Percent 0.01 |

*Example 2*

100 cubic meters (NPT) per hour of the following gas are purified in the unit as described in the drawing: 7.9 per cent $C_2H_2$, 0.08 per cent $C_3H_4$, 0.05 per cent $C_4H_4$, 0.11 per cent $C_4H_2$ and 0.1 per cent $C_6H_6$, balance $CO_2$, $CO$, $H_2$ and $N_2$.

1.15 cubic meters of butyrolactone are used in the absorber C at 20° C. and 8 atmospheres pressure. The tail gas has about the same composition as that obtained according to Example 1.

In the rectifying tower G the pressure is normal and the temperature 20° C.

The temperature in the desorber H is 100° C. and the pressure 1.2 atmospheres. The impurities of the gas withdrawn through L (7.7 cubic meters per hour) amount to about 0.05 per cent $CO_2$, 0.2 per cent $C_3H_4$, less than 0.005 per cent $C_4H_4$, 0.01 per cent $C_4H_2$ and 0.005 per cent $C_6H_6$. This gas is washed with 0.2 cubic meter of butyrolactone at 20° C. which enters through pipe O and leaves through pipe N. The gas withdrawn from the washer M through pipe P contains only 0.05 per cent $CO_2$, <0.1 per cent $C_3H_4$, less than 0.001 per cent $C_4H_4$, less than 0.002 per cent $C_4H_2$ and less than 0.001 per cent $C_6H_6$.

We claim:

1. A method for the recovery of acetylene from dilute acetylene obtained in the high-temperature decomposition of more saturated hydrocarbon gases which comprises contacting the dilute acetylene in an absorbing zone under a pressure between 2 and 10 atmospheres and at substantially normal temperature with an organic solvent having a boiling point exceeding 100° C. and having selective dissolving power for acetylene, leading the solvent emerging from the absorbing zone into the top of a separate rectifying column while releasing the pressure to about normal, allowing the solvent to descend in the rectifying column in counter-current to the gas obtained by subjecting the solvent emerging from the bottom of the rectifying column in a separate stripping vessel to a pressure of 0.2 to 0.5 atmosphere and elevated temperature below the boiling point of said solvent, and withdrawing a stream of substantially pure acetylene at a point between the bottom and the top of the rectifying column.

2. The method as set forth in claim 1, wherein the gas arriving at the top of the rectifying column is added to the dilute acetylene introduced into the absorbing zone.

3. The method as set forth in claim 1, wherein the gas arriving at the top of the rectifying column is added to the dilute acetylene introduced into the absorbing zone, and the solvent stripped of acetylene in the stripping vessel is recycled to the absorbing zone.

4. The method as set forth in claim 1, wherein the gas arriving at the top of the rectifying column is added to the dilute acetylene introduced into the absorbing zone, the solvent stripped of acetylene in the stripping vessel is recycled to the absorbing zone, and the stream of substantially pure acetylene withdrawn at a point between the bottom and the top of the rectifying column is contacted with such an amount of an organic solvent having dissolving power for acetylene as is insufficient for dissolving the acetylene contained in this stream.

5. A method for the recovery of acetylene from dilute acetylene obtained in the high-temperature decomposition of more saturated hydrocarbon gases which comprises contacting the dilute acetylene in an absorbing zone under a pressure between 2 and 10 atmospheres and at substantially normal temperature with an organic solvent having a boiling point exceeding 100° C. and having selective dissolving power for acetylene, leading the solvent emerging from the absorbing zone into the top of a separate rectifying column while releasing the pressure to about normal, allowing the solvent to descend in the rectifying column in counter-current to the gas obtained by subjecting the solvent emerging from the bottom of the rectifying column in a separate stripping vessel to a pressure of 0.2 to 0.5 atmosphere and elevated temperature below the boiling point of said solvent, withdrawing a stream of substantially pure acetylene at a point between the bottom and the top of the rectifying column, adding the gas arriving at the top of the rectifying column to the dilute acetylene introduced into the absorbing zone, recycling the solvent stripped of acetylene in the stripping vessel to the absorbing zone, contacting the stream of substantially pure acetylene withdrawn at a point between the bottom and the top of the rectifying column with such an amount of part of the solvent stripped of acetylene in the stripping vessel as is insufficient for dissolving the acetylene contained in this stream, and returning the latter solvent to the absorbing zone.

6. The method as set forth in claim 5, wherein the solvent contacted with the stream of substantially pure acetylene is thereafter stripped of the gases dissolved therein, and the gases thus obtained are added to the dilute acetylene introduced into the absorbing zone.

7. A method for the recovery of acetylene from dilute acetylene obtained in the high-temperature decomposition of more saturated hydrocarbon gases which comprises contacting the dilute acetylene in an absorbing zone under a pressure between 2 and 10 atmospheres and at substantially normal temperature with an organic solvent having a boiling point exceeding 100° C. and having selective dissolving power for acetylene, leading the solvent emerging from the absorbing zone into the top of a separate rectifying column while releasing the pressure to about normal, allowing the solvent to descend in the rectifying column in counter-current to the gas obtained by subjecting the solvent emerging from the bottom of the rectifying column in a separate stripping vessel to a pressure of 0.2 to 0.5 atmosphere and elevated temperature below the boiling point of said solvent, withdrawing a stream of substantially pure acetylene at a point between the bottom and the top of the rectifying column, adding the gas arriving at the top of the rectifying column to the dilute acetylene introduced into the absorbing zone, recycling the solvent stripped of acetylene in the stripping vessel to the absorbing zone, contacting the stream of substantially pure acetylene withdrawn at a point between the bottom and the top of the rectifying column with such an amount of an organic solvent having dissolving power for acetylene as is insufficient for dissolving the acetylene contained in this stream, stripping this solvent of the gases contained therein, and recycling the latter stripped solvent to renewed contact with the stream of substantially pure acetylene.

References Cited in the file of this patent

UNITED STATES PATENTS

| Number | Name | Date |
|---|---|---|
| 2,063,680 | Isham | Dec. 8, 1936 |
| 2,236,964 | Babcock | Apr. 1, 1941 |
| 2,250,925 | Babcock | July 29, 1941 |
| 2,356,986 | Frey | Aug. 29, 1944 |
| 2,374,984 | Evans et al. | May 1, 1945 |
| 2,395,362 | Welling | Feb. 19, 1946 |